United States Patent

Arakawa

Patent Number: 5,477,059
Date of Patent: Dec. 19, 1995

[54] SUPERPOSITION PROCESSING METHOD AND APPARATUS FOR RADIATION IMAGES

[75] Inventor: Satoshi Arakawa, Kanagawa, Japan

[73] Assignee: Fuji Photo Film Co., Ltd., Kanagawa, Japan

[21] Appl. No.: 325,475

[22] Filed: Oct. 19, 1994

[30] Foreign Application Priority Data

Dec. 3, 1993  [JP]  Japan .................................. 5-303779

[51] Int. Cl.$^6$ .................................................. G03B 42/02
[52] U.S. Cl. .......................................... 250/587; 250/586
[58] Field of Search .................................. 250/586, 587, 250/584, 585

[56] References Cited

U.S. PATENT DOCUMENTS 4,356,398  10/1982  Komaki et al. .
4,485,302  11/1984  Tanaka et al. .......................... 250/586

FOREIGN PATENT DOCUMENTS 1-253725  10/1989  Japan .................................. 250/586
6-130523   5/1994  Japan .................................. 250/586

Primary Examiner—Carolyn E. Fields
Assistant Examiner—Edward J. Glick
Attorney, Agent, or Firm—Sughrue, Mion, Zinn, Macpeak & Seas

[57] ABSTRACT

A radiation image storage panel, on which a radiation image has been stored, is exposed to stimulating rays, which cause it to emit light in proportion to the amount of energy stored thereon during its exposure to the radiation. The emitted light is photoelectrically detected on the front surface side of the radiation image storage panel, which is the stimulating ray incidence side, and on the back surface side, two image signals being thereby obtained. The image signal components of the two image signals are added to each other, which represent corresponding picture elements on the front and back surfaces of the radiation image storage panel, an addition signal being thereby obtained. The addition ratio for the two image signals is changed in accordance with at least a single factor selected from the group consisting of the dose of the radiation irradiated to the radiation image storage panel, the kind of the radiation image storage panel, the spatial frequency of interest in the radiation image, and the conditions under which the radiation was irradiated.

6 Claims, 2 Drawing Sheets

SUPERPOSITION PROCESSING METHOD AND APPARATUS FOR RADIATION IMAGES

BACKGROUND OF THE INVENTION

1. Field of the Invention

This invention relates to a superposition processing method and apparatus for a radiation image, wherein two image signals, which have been independently detected from opposite surfaces of a radiation image storage panel, are superposed one upon the other.

2. Description of the Prior Art

It has been proposed to use stimulable phosphors in radiation image recording and reproducing systems. Specifically, a radiation image of an object, such as a human body, is recorded on a sheet provided with a layer of the stimulable phosphor (hereinafter referred to as a stimulable phosphor sheet or a radiation image storage panel). The stimulable phosphor sheet, on which the radiation image has been stored, is then scanned with stimulating rays, such as a laser beam, which cause it to emit light in proportion to the amount of energy stored thereon during its exposure to the radiation. The light emitted by the stimulable phosphor sheet, upon stimulation thereof, is photoelectrically detected and converted into an electric image signal. The image signal is then processed and used for the reproduction of the radiation image of the object as a visible image on a recording material.

Techniques for carrying out superposition processing on radiation images have heretofore been disclosed in, for example, U.S. Pat. No. 4,356,398. In general, radiation images are used for diagnoses of illnesses and for other purposes. When a radiation image is used for such purposes, it is required that even small differences in the radiation energy absorption characteristics among structures of an object can be detected accurately in the radiation image. The extent, to which such differences in the radiation energy absorption characteristics can be detected in a radiation image, is referred to as the contrast detection performance or simply as the detection performance. A radiation image having better detection performance has better image quality and can serve as a more effective tool in, particularly, the efficient and accurate diagnosis of an illness. Therefore, in order for the image quality to be improved, it is desirable that the detection performance of the radiation image may be enhanced. Practically, the detection performance is adversely affected by various noises.

For example, in radiation image recording and reproducing systems using stimulable phosphor sheets, it has been found that the noises described below occur during the step for recording a radiation image on a radiation image storage panel and reading out the radiation image therefrom.

(1) A quantum noise of radiation produced by a radiation source.

(2) A noise due to nonuniformity in how a stimulable phosphor coated on the radiation image storage panel is distributed or how stimulable phosphor grains are distributed on the radiation image storage panel.

(3) A noise of stimulating rays, which cause the radiation image storage panel to emit light in proportion to the amount of energy stored thereon during its exposure to radiation.

(4) A noise of light, which is emitted by the radiation image storage panel, guided and detected.

(5) An electric noise in the system for amplifying and processing an electric signal.

Superposition processing is carried out in order to reduce the aforesaid noises markedly so that even small differences in the radiation energy absorption characteristics among structures of an object can be found accurately in a visible radiation image, which is reproduced finally, i.e. the detection performance of the radiation image can be improved markedly. Ordinary techniques and effects of the superposition processing are as described below.

Specifically, radiation images are recorded on a plurality of recording media, which overlap one upon another. A plurality of image signals are detected from the plurality of the recording media and then superposed one upon another (i.e., added to one another). In this manner, various noises described above can be reduced. Specifically, an image signal having a high signal-to-noise ratio can be obtained.

Also, it is possible to employ a technique, wherein two image signals are detected from the opposite surfaces of the radiation image storage panel, and the image signal components of the two image signals are then added together, which image signal components represent corresponding picture elements on the front and back surfaces of the radiation image storage panel. In such cases, the image information, which has been recorded with the radiation absorbed by the portion of the stimulable phosphor layer located on the radiation incidence side, is primarily obtained from the surface of the radiation image storage panel, which surface was located on the radiation incidence side when the radiation image storage panel was exposed to the radiation during the image recording operation. Also, the image information, which has been recorded with the radiation absorbed by the portion of the stimulable phosphor layer located on the side opposite to the radiation incidence side, is primarily obtained from the surface of the radiation image storage panel, which surface was located on the side opposite to the radiation incidence side when the radiation image storage panel was exposed to the radiation during the image recording operation.

When the two image signals detected from the opposite surfaces of the radiation image storage panel are superposed one upon the other, a superposition image signal can be obtained which reflects a larger amount of image information. Specifically, an image signal having a higher signal-to-noise ratio can be obtained.

In cases where a visible image is reproduced from an addition signal, which has been obtained by adding two image signals to each other, noise reduces in the visible image as a whole. Also, the sharpness of the visible image becomes low. Therefore, for example, in cases where an image region of a high spatial frequency is to be used and therefore is required to have a good image quality, signal processing should preferably be carried out by using only the image signal, which is detected from the front surface side of the radiation image storage panel, such that the image may have good image quality and can serve as an effective tool in, particularly, the efficient and accurate diagnosis of an illness. In cases where an image region of a low spatial frequency is to be used and therefore is required to have a good image quality, it is not necessary for the region of a high spatial frequency to have high sharpness in the reproduced image, and noise in the image as a whole should be reduced such that the image may have good image quality and can serve as an effective tool in, particularly, the efficient and accurate diagnosis of an illness. Therefore, in such cases, the superposition processing described above may be carried out.

As described above, the spatial frequency of interest in the image to be used varies for different kinds of images. Therefore, if the superposition processing is merely carried out, the problem will occur in that appropriate addition processing cannot be carried out. Also, noise components vary for different doses of radiation irradiated to the radiation image storage panel and for different kinds of the radiation image storage panels. Therefore, the addition ratio, in which the two image signals are added to each other and which yields the highest signal-to-noise ratio, varies for different doses of radiation and different kinds of the radiation image storage panels.

SUMMARY OF THE INVENTION

The primary object of the present invention is to provide a superposition processing method for a radiation image, wherein a superposition image signal is obtained such that an image, in which the signal-to-noise ratio at a spatial frequency of interest is highest, may be reproduced regardless of the kind of the image to be used, the dose of radiation irradiated to a radiation image storage panel, or the like.

Another object of the present invention is to provide an apparatus for carrying out the superposition processing method for a radiation image.

The superposition processing method and apparatus for a radiation image in accordance with the present invention are characterized by photoelectrically detecting light emitted by two surfaces of a radiation image storage panel, on which a radiation image has been stored, and adding the thus obtained two image signals to each other in an adjusted addition ratio.

Specifically, the present invention provides a superposition processing method for a radiation image, comprising the steps of:

i) exposing a radiation image storage panel, which has been exposed to radiation carrying image information and on which a radiation image has thereby been stored, to stimulating rays, which cause the radiation image storage panel to emit light in proportion to the amount of energy stored thereon during its exposure to the radiation, ii) photoelectrically detecting the emitted light independently on the front surface side of the radiation image storage panel, which is the stimulating ray incidence side, and on the back surface side of the radiation image storage panel, which is opposite to the stimulating ray incidence side, two image signals, each of which is made up of a series of image signal components, being thereby obtained, and iii) adding the image signal components of the two image signals to each other, which image signal components represent corresponding picture elements on the front and back surfaces of the radiation image storage panel, an addition signal being thereby obtained, wherein an addition ratio, in which the two image signals are added to each other, is changed in accordance with at least a single factor selected from the group consisting of the dose of the radiation irradiated to the radiation image storage panel, the kind of the radiation image storage panel, the spatial frequency of interest in the radiation image, and the conditions under which the radiation was irradiated.

The present invention also provides an apparatus for carrying out the superposition processing method for a radiation image in accordance with the present invention. Specifically, the present invention also provides a superposition processing apparatus for a radiation image, comprising:

i) a means for exposing a radiation image storage panel, which has been exposed to radiation carrying image information and on which a radiation image has thereby been stored, to stimulating rays, which cause the radiation image storage panel to emit light in proportion to the amount of energy stored thereon during its exposure to the radiation, ii) a detection system for photoelectrically detecting the emitted light independently on the front surface side of the radiation image storage panel, which is the stimulating ray incidence side, and on the back surface side of the radiation image storage panel, which is opposite to the stimulating ray incidence side, two image signals, each of which is made up of a series of image signal components, being thereby obtained, and iii) an addition means for adding the image signal components of the two image signals to each other, which image signal components represent corresponding picture elements on the front and back surfaces of the radiation image storage panel, wherein the addition means changes an addition ratio, in which the two image signals are added to each other, in accordance with at least a single factor selected from the group consisting of the dose of the radiation irradiated to the radiation image storage panel, the kind of the radiation image storage panel, the spatial frequency of interest in the radiation image, and the conditions under which the radiation was irradiated.

With the superposition processing method and apparatus for a radiation image in accordance with the present invention, the radiation image storage panel, on which the radiation image has been stored, is exposed to stimulating rays, which cause the radiation image storage panel to emit light in proportion to the amount of energy stored thereon during its exposure to the radiation. The light is thus emitted by the two surfaces of the radiation image storage panel. The emitted light is photoelectrically detected independently on the front surface side of the radiation image storage panel, which is the stimulating ray incidence side, and on the back surface side of the radiation image storage panel, which is opposite to the stimulating ray incidence side. In this manner, two image signals, each of which is made up of a series of image signal components, are obtained. The image signal components of the two image signals are added to each other, which image signal components represent corresponding picture elements on the front and back surfaces of the radiation image storage panel. During the addition step, the addition ratio, in which the two image signals are added to each other, is changed in accordance with at least a single factor selected from the group consisting of the dose of the radiation irradiated to the radiation image storage panel, the kind of the radiation image storage panel, the spatial frequency of interest in the radiation image, and the conditions under which the radiation was irradiated. In this manner, an addition signal is obtained.

The addition ratio can be varied in accordance with the kind of the image to be used, the dose of radiation irradiated to the radiation image storage panel, or the like. Therefore, the addition ratio can be set such that the signal-to-noise ratio at the spatial frequency of interest in the image to be used may become highest.

DESCRIPTION OF THE PREFERRED EMBODIMENTS

The present invention will hereinbelow be described in further detail with reference to the accompanying drawings.

Figure 1:
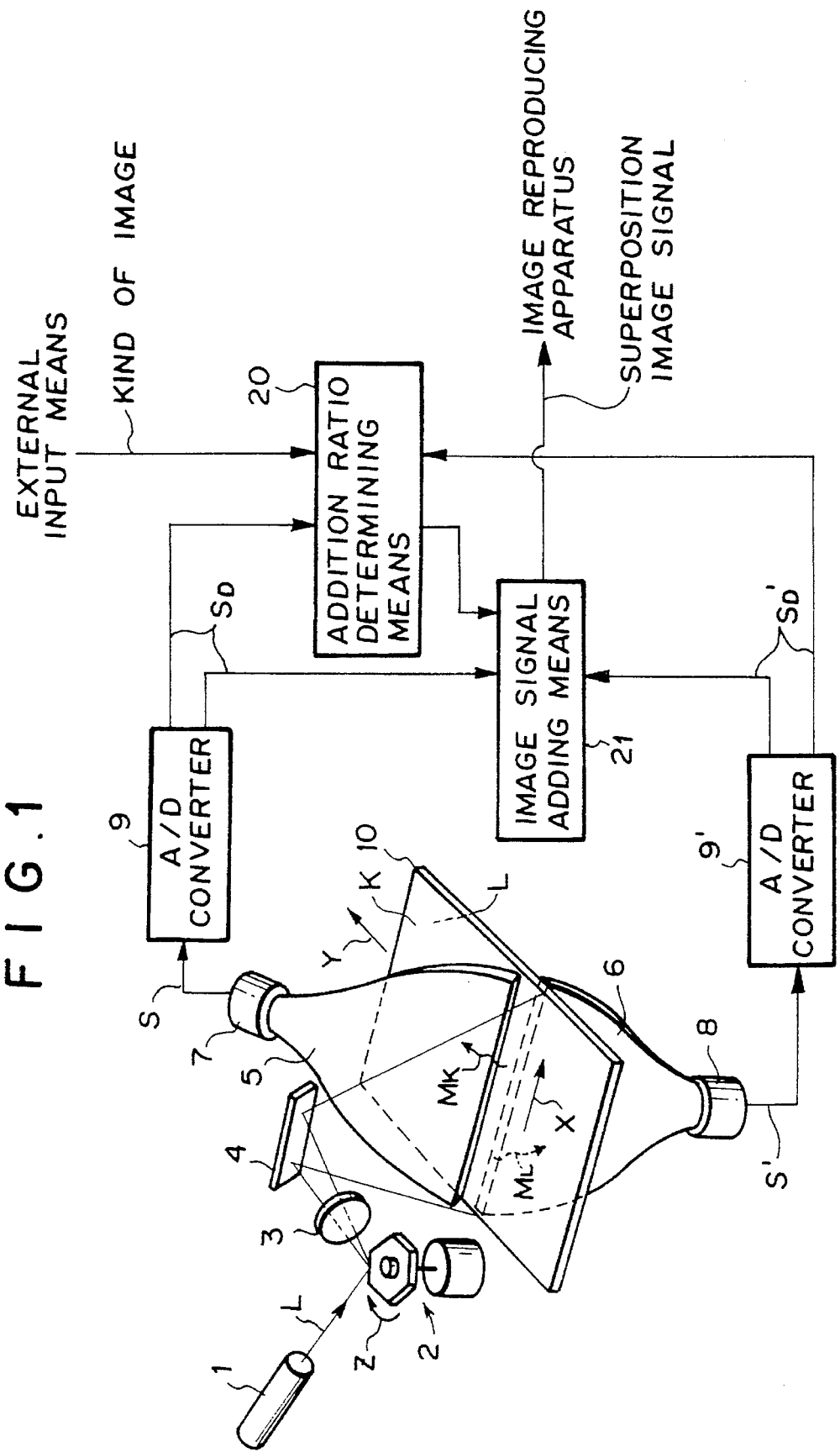
FIG. 1 is a block diagram showing an embodiment of the superposition processing apparatus for a radiation image in accordance with the present invention.

FIG. 1 is a block diagram showing an embodiment of the superposition processing apparatus for a radiation image in accordance with the present invention. The illustrated superposition processing apparatus comprises a laser beam source 1, which produces a laser beam L serving as the stimulating rays. The superposition processing apparatus also comprises a rotating polygon mirror 2, an fθ lens 3, and a mirror 4, which cause the laser beam L having been produced by the laser beam source 1 to scan the front surface K of a radiation image storage panel 10 in the main scanning direction indicated by the arrow X. When the radiation image storage panel 10 is scanned with the laser beam L in the main scanning direction indicated by the arrow X, the scanned portion of the radiation image storage panel 10 emits light M in proportion to the amount of energy stored thereon during its exposure to radiation. The superposition processing apparatus further comprises a first light guide member 5, which is located at a position for guiding the emitted light M on the side of the front surface K of the radiation image storage panel 10, and a second light guide member 6, which is located at a position for guiding the emitted light M on the side of the back surface L of the radiation image storage panel 10. The superposition processing apparatus still further comprises a first photomultiplier 7 and a second photomultiplier 8 for photoelectrically converting the emitted light M, which has been guided by the light guide members 5 and 6, and thereby obtaining a first image signal S and a second image signal S'. The superposition processing apparatus also comprises a first analog-to-digital converter 9 and a second analog-to-digital converter 9' for respectively converting the obtained first image signal S and the obtained second image signal S' into a first digital image signal SD and a second digital image signal SD'. The superposition processing apparatus further comprises an addition ratio determining means 20 for calculating the addition ratio, in which the two image signals SD and SD' are to be added to each other, in accordance with the two image signals SD and SD', and/or the kind of the radiation image specified from an external input means, and/or other factors. The superposition processing apparatus still further comprises an image signal adding means 21 for adding the image signal components of the two image signals SD and SD' to each other, which image signal components represent corresponding picture elements on the front surface K and the back surface L of the radiation image storage panel 10.

How this embodiment operates will be described hereinbelow.

The laser beam L, which has been produced by the laser beam source 1, impinges upon the rotating polygon mirror 2, which is rotating in the direction indicated by the arrow Z. The laser beam L is reflected by the rotating polygon mirror 2. The laser beam L is then condensed by the fθ lens 3 and reflected by the mirror 5. In this manner, the laser beam L scans the surface of the radiation image storage panel 10, on which the radiation image has been stored, in the main scanning direction indicated by the arrow X. At the same time, the radiation image storage panel 10 is conveyed by a sub-scanning means (not shown) in the sub-scanning direction indicated by the arrow Y.

When the radiation image storage panel 10 is exposed to the laser beam L, the exposed portion of the radiation image storage panel 10 emits the light M in proportion to the amount of energy stored thereon during its exposure to radiation. The emitted light M is radiated from both the front surface K, upon which the laser beam L is impinges, and the back surface L, which is opposite to the laser beam incidence surface. The emitted light MK, which has been radiated from the front surface K of the radiation image storage panel 10, is guided by the first light guide member 5, which is located on the side of the front surface K. The emitted light MK is then photoelectrically converted by the first photomultiplier 7, and the first image signal S is thereby obtained. The first image signal S is then converted by the first analog-to-digital converter 9 into the first digital image signal SD.

The emitted light ML, which has been radiated from the back surface L of the radiation image storage panel 10, is guided by the second light guide member 6, which is located on the side of the back surface L. The emitted light ML is then photoelectrically converted by the second photomultiplier 8, and the second image signal S' is thereby obtained. The second image signal S' is then converted by the second analog-to-digital converter 9' into the second digital image signal SD'.

A visible image reproduced from the image information carried by the emitted light MK radiated from the front surface K of the radiation image storage panel 10, upon which the laser beam L impinges, has the characteristics such that it has a higher sharpness and contains more noise than a visible image reproduced from the image information carried by the emitted light ML radiated from the back surface K of the radiation image storage panel 10. Also, in cases where the amount of the emitted light M is large, i.e. in cases where the dose of radiation irradiated to the radiation image storage panel 10 was large, an image having a high sharpness is obtained. In cases where the amount of the emitted light M is small, i.e. in cases where the dose of radiation irradiated to the radiation image storage panel 10 was small, an image containing little noise is obtained. Therefore, in cases where the spatial frequency of the radiation image to be reproduced and used is high and the radiation image to be used is required to have a high sharpness, the image information obtained from the front surface K should primarily be utilized. However, in such cases, the image quality of the image and its capability of serving as an effective tool in, particularly, the efficient and accurate diagnosis of an illness are adversely affected by noise. Therefore, in cases where a slight decrease in the image sharpness is allowable, noise is to be reduced, and the image quality of the image and its capability of serving as an effective tool in, particularly, the efficient and accurate diagnosis of an illness are to be kept good, the image information obtained from the back surface L should primarily be utilized.

With this embodiment of the superposition processing apparatus for a radiation image in accordance with the present invention, The first digital image signal SD, which has been obtained from the front surface K of the radiation image storage panel 10, and the second digital image signal SD', which has been obtained from the back surface L of the radiation image storage panel 10, are fed into the addition ratio determining means 20. In this manner, the amount of the emitted light MK radiated from the front surface K and the amount of the emitted light ML radiated from the back surface L are always monitored. Also, the addition ratio determining means 20 is connected to the external input means, which may be constituted of a keyboard, or the like. Items, such as the kind of the image, the spatial frequency of interest in the image to be used, the items affecting noise, e.g. the image region to be used, the kind of the radiation image storage panel 10, and the like, are inputted from the external input means.

In accordance with the amounts of the emitted light MK and the emitted light ML, which have been received from the first analog-to-digital converter 9 and the second analog-to-digital converter 9', and the items inputted from the external input means, the addition ratio determining means 20 determines the addition ratio, in which the first digital image signal SD and the second digital image signal SD' are to be added to each other. For this purpose, a predetermined function based on these items is utilized. A signal representing the determined addition ratio is fed from the addition ratio determining means 20 into the image signal adding means 21.

The image signal adding means 21 weights the first digital image signal SD and the second digital image signal SD' in accordance with the addition ratio determined by the addition ratio determining means 20. The image signal adding means 21 then adds the image signal components of the two image signals SD and SD' to each other, which image signal components represent corresponding picture elements on the front surface K and the back surface L of the radiation image storage panel 10. A superposition digital image signal, which has been obtained from the addition, is fed into an external image reproducing apparatus, which reproduces a superposition radiation image.

In this manner, a superposition radiation image can be obtained such that the signal-to-noise ratio at the spatial frequency of interest in the image may be highest.

The function for the determination of the addition ratio by the addition ratio determining means 20 may be set such that, for example, regardless of the items inputted from the external input means, the addition ratio of the first digital image signal SD may be higher than the addition ratio of the second digital image signal SD' when the amount of the emitted light M is large, and such that the addition ratio of the first digital image signal SD may be lower than the addition ratio of the second digital image signal SD' when the amount of the emitted light M is small. In this manner, an image having a high sharpness can be obtained when the amount of the emitted light M is large. Also, an image containing little noise can be obtained when the amount of the emitted light M is small.

Alternatively, the function for the determination of the addition ratio by the addition ratio determining means 20 may be set in accordance with only the spatial frequency of the image to be used and regardless of the amount of the emitted light M. Specifically, in cases where the image to be used has a fine structure, the addition ratio of the first digital image signal SD is set to be higher than the addition ratio of the second digital image signal SD' such that the sharpness of the image may be kept high. Also, in cases where the image to be used has a simple structure, the addition ratio of the second digital image signal SD' is set to be comparatively high such that noise can be reduced. In this manner, the addition ratio may be selected such that the signal-to-noise ratio at the spatial frequency of interest in the image to be used may become highest.

Figure 2:
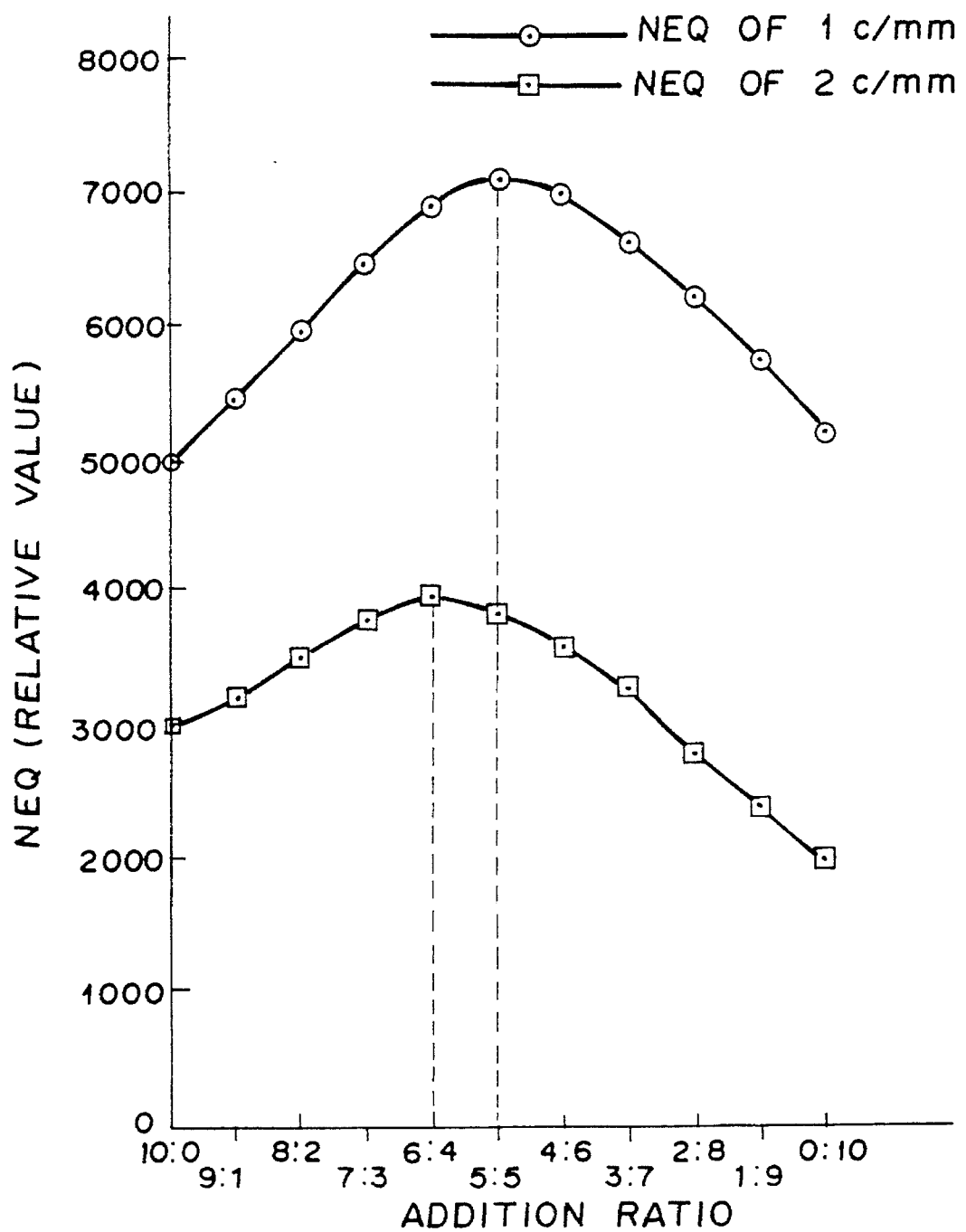
FIG. 2 is a graph showing the results of comparison of image sharpness in accordance with addition ratios.

FIG. 2 shows how the NEQ values (plotted on the vertical axis; relative value) at spatial frequencies of interest (1 c/mm and 2 c/mm) in the image to be used change when image signals are independently detected from the two surfaces of the radiation image storage panel 10, on which a radiation image has been stored with a radiation dose of 0.1 mR, and the addition ratio (plotted on the horizontal axis) for the two image signals is changed at intervals of 10% between 10:0 (i.e., front surface 10: back surface 0) and 0:10 (i.e., front surface 0: back surface 10). The NEQ (noise equivalent quanta) is an index proportional to $(S/N)^2$.

From the results shown in FIG. 2, it has been found that the addition ratio associated with the maximum NEQ varies in accordance with the spatial frequency of interest in the image to be used (NEQ).

As described above, with this embodiment of the superposition processing apparatus for a radiation image in accordance with the present invention, the image signal, which has been detected from the front surface K of the radiation image storage panel 10, and the image signal, which has been detected from the back surface L of the radiation image storage panel 10, can be added to each other in a variable ratio by the image signal adding means 21. In this manner, the signal-to-noise ratio at the spatial frequency of interest in the reproduced image can be kept highest.

The superposition processing apparatus for a radiation image in accordance with the present invention is not limited to the embodiment described above and may be embodied in any of various other ways. The superposition processing apparatus for a radiation image in accordance with the present invention may be set such that the addition ratio, in which the two image signals (i.e. the two digital image signals) are added to each other, is changed in accordance with at least a single factor selected from the group consisting of the amount of the light emitted by the radiation image storage panel (i.e., the dose of the radiation irradiated to the radiation image storage panel), the kind of the radiation image storage panel, the spatial frequency of interest in the radiation image, and the conditions under which the radiation was irradiated, e.g. the direction of irradiation of the radiation.

As in the image processing step carried out in the conventional radiation image recording and reproducing system described above, the superposition processing apparatus for a radiation image in accordance with the present invention may be set such that the first image signal S obtained from the first photomultiplier 7 and the second image signal S' obtained from the second photomultiplier 8 are logarithmically converted before being subjected to the analog-to-digital conversion, and the addition is carried out after the logarithmic conversion of the image signals.

What is claimed is:

1. A superposition processing method for a radiation image, comprising the steps of:

i) exposing a radiation image storage panel, which has been exposed to radiation carrying image information and on which a radiation image has thereby been stored, to stimulating rays, which cause the radiation image storage panel to emit light in proportion to the amount of energy stored thereon during its exposure to the radiation, ii) photoelectrically detecting the emitted light independently on the front surface side of the radiation image storage panel, which is the stimulating ray incidence side, and on the back surface side of the radiation image storage panel, which is opposite to the stimulating ray incidence side, two image signals, each of which is made up of a series of image signal components, being thereby obtained, and iii) adding the image signal components of the two image signals to each other, which image signal components represent corresponding picture elements on the front and back surfaces of the radiation image storage panel, an addition signal being thereby obtained, wherein an addition ratio, in which the two image signals are added to each other, is changed in accordance with at least a single factor selected from the group consisting of the dose of the radiation irradiated to the radiation image storage panel, the kind of the radiation image storage panel, the spatial frequency of interest in the radiation image, and the conditions under which the radiation was irradiated.

2. A superposition processing method for a radiation image as defined in claim 1 wherein the stimulating rays are a laser beam.

3. A superposition processing method for a radiation image as defined in claim 1 wherein the radiation image storage panel is two-dimensionally scanned with the stimulating rays.

4. A superposition processing apparatus for a radiation image, comprising:

i) a means for exposing a radiation image storage panel, which has been exposed to radiation carrying image information and on which a radiation image has thereby been stored, to stimulating rays, which cause the radiation image storage panel to emit light in proportion to the amount of energy stored thereon during its exposure to the radiation, ii) a detection system for photoelectrically detecting the emitted light independently on the front surface side of the radiation image storage panel, which is the stimulating ray incidence side, and on the back surface side of the radiation image storage panel, which is opposite to the stimulating ray incidence side, two image signals, each of which is made up of a series of image signal components, being thereby obtained, and iii) an addition means for adding the image signal components of the two image signals to each other, which image signal components represent corresponding picture elements on the front and back surfaces of the radiation image storage panel, wherein said addition means changes an addition ratio, in which the two image signals are added to each other, in accordance with at least a single factor selected from the group consisting of the dose of the radiation irradiated to the radiation image storage panel, the kind of the radiation image storage panel, the spatial frequency of interest in the radiation image, and the conditions under which the radiation was irradiated.

5. A superposition processing apparatus for a radiation image as defined in claim 4 wherein the stimulating rays are a laser beam.

6. A superposition processing apparatus for a radiation image as defined in claim 4 wherein the radiation image storage panel is two-dimensionally scanned with the stimulating rays.

* * * * *